United States Patent
Laster et al.

(10) Patent No.: US 7,096,667 B2
(45) Date of Patent: Aug. 29, 2006

(54) CONTROL OF GAS TURBINE FOR CATALYST ACTIVATION

(75) Inventors: Walter Ray Laster, Oviedo, FL (US); Ramarao V. Bandaru, Orlando, FL (US); Joan Mae Baer, Casselberry, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 248 days.

(21) Appl. No.: 10/754,196

(22) Filed: Jan. 9, 2004

(65) Prior Publication Data

US 2005/0150231 A1    Jul. 14, 2005

(51) Int. Cl.
  *F02C 9/16*   (2006.01)
  *F23R 3/40*   (2006.01)
(52) U.S. Cl. .............................. 60/723; 60/726; 60/795
(58) Field of Classification Search ................ 60/723, 60/726, 785, 794, 795
  See application file for complete search history.

(56) References Cited

U.S. PATENT DOCUMENTS

| | | | |
|---|---|---|---|
| 3,973,391 A | 8/1976 | Reed et al. | |
| 4,028,884 A | 6/1977 | Martz et al. | |
| 4,083,181 A | 4/1978 | Adamson | |
| 4,598,551 A | 7/1986 | Dimitroff, Jr. et al. | |
| 4,754,607 A * | 7/1988 | Mackay | 60/723 |
| 5,063,963 A | 11/1991 | Smith | |
| 5,161,364 A | 11/1992 | Brunn et al. | |
| 5,174,105 A | 12/1992 | Hines | |
| 5,248,251 A | 9/1993 | Dalla Betta et al. | |
| 5,258,349 A | 11/1993 | Dalla Bette et al. | |
| 5,537,864 A | 7/1996 | Sood | |
| 5,732,546 A | 3/1998 | Pineo et al. | |
| 6,328,526 B1 | 12/2001 | Seki et al. | |
| 6,415,608 B1 | 7/2002 | Newburry | |
| 6,463,730 B1 | 10/2002 | Keller et al. | |
| 6,532,743 B1 | 3/2003 | Fischer | |
| 6,615,574 B1 | 9/2003 | Marks | |
| 6,796,129 B1 * | 9/2004 | Yee et al. | 60/723 |

* cited by examiner

Primary Examiner—Louis J. Casaregola

(57) ABSTRACT

A catalytic gas turbine includes a compressor, a catalytic combustor, a turbine, and a flow path conducting a bypass portion of the compressed air around the combustor and turbine. A method of operating the catalytic gas turbine to activate a catalyst in the catalytic combustor includes opening an inlet guide vane upstream of the compressor to a position to produce an increased volume of compressed air. The increased volume exceeds a volume of compressed air needed to support combustion. A bypass portion of the compressed air is extracted and directed around the combustor and turbine. The method may also include extracting a recirculation portion of the compressed air and directing the recirculation portion into the inlet of the compressor.

8 Claims, 3 Drawing Sheets

CONTROL OF GAS TURBINE FOR CATALYST ACTIVATION

FIELD OF THE INVENTION

This invention relates generally to catalytic gas turbine operation, and more particularly to a method of controlling airflows in the gas turbine to achieve activation of a catalyst.

BACKGROUND OF THE INVENTION

It is known to use catalytic combustion in gas turbines to reduce NOx emissions. Catalytic gas turbines may include a compressor, a catalytic combustor, and a turbine. Typically, a catalyst is provided in an upstream portion of the catalytic combustor to catalytically accelerate a combustion process, thereby allowing combustion to occur at lower temperatures for reducing NOx formation. To initiate the catalytic combustion process, the catalyst must first be heated to an activation temperature. One such catalytic combustion technique, known as lean catalytic, lean burn (LCL) combustion, involves completely mixing fuel and air to form a lean fuel mixture that is passed over a catalytically active surface prior to introduction into a downstream combustion zone. However, the LCL technique requires precise control of fuel and air volumes and may require the use a complex preburner to bring the fuel/air mixture to lightoff conditions. An alternative catalytic combustion technique is the rich catalytic, lean burn (RCL) combustion process that includes mixing fuel with a first portion of air from a compressor to form a rich fuel mixture. The rich fuel mixture is passed over a catalytic surface and mixed with a second portion of air in a post catalytic combustion zone to complete the combustion process. Activation of the catalyst is achieved when the temperature of the compressed air exiting the compressor and entering the catalytic reactor element is elevated to a temperature at which the catalyst becomes active. During startup and loading of the gas turbine, a pilot flame is typically used to initiate and then stabilize combustion in the downstream combustion zone until the catalyst is activated. One problem with the use of a pilot, however, is that the pilot is typically a diffusion-type flame producing undesired NOx emissions. In addition, at a certain point during startup loading, such as at 50% of a base load, the pilot alone may not be able to sustain stable combustion. Consequently, the catalyst needs to be activated before reaching a point of loading wherein the pilot may be unable to sustain stabilized combustion. For example, in older gas turbines having comparatively lower compression ratios, or in a relatively cold ambient temperature environment, it may take longer for the compressor exit gas temperature to reach a catalyst activation temperature. As a result, pilot stabilized combustion in the downstream combustion zone may become unstable before catalytic combustion can be activated. Accordingly, early activation of the catalyst in a catalytic gas turbine is desired.

BRIEF DESCRIPTION OF THE DRAWINGS

The invention will be more apparent from the following description in view of the drawings that show.

DETAILED DESCRIPTION OF THE INVENTION

Figure 1:
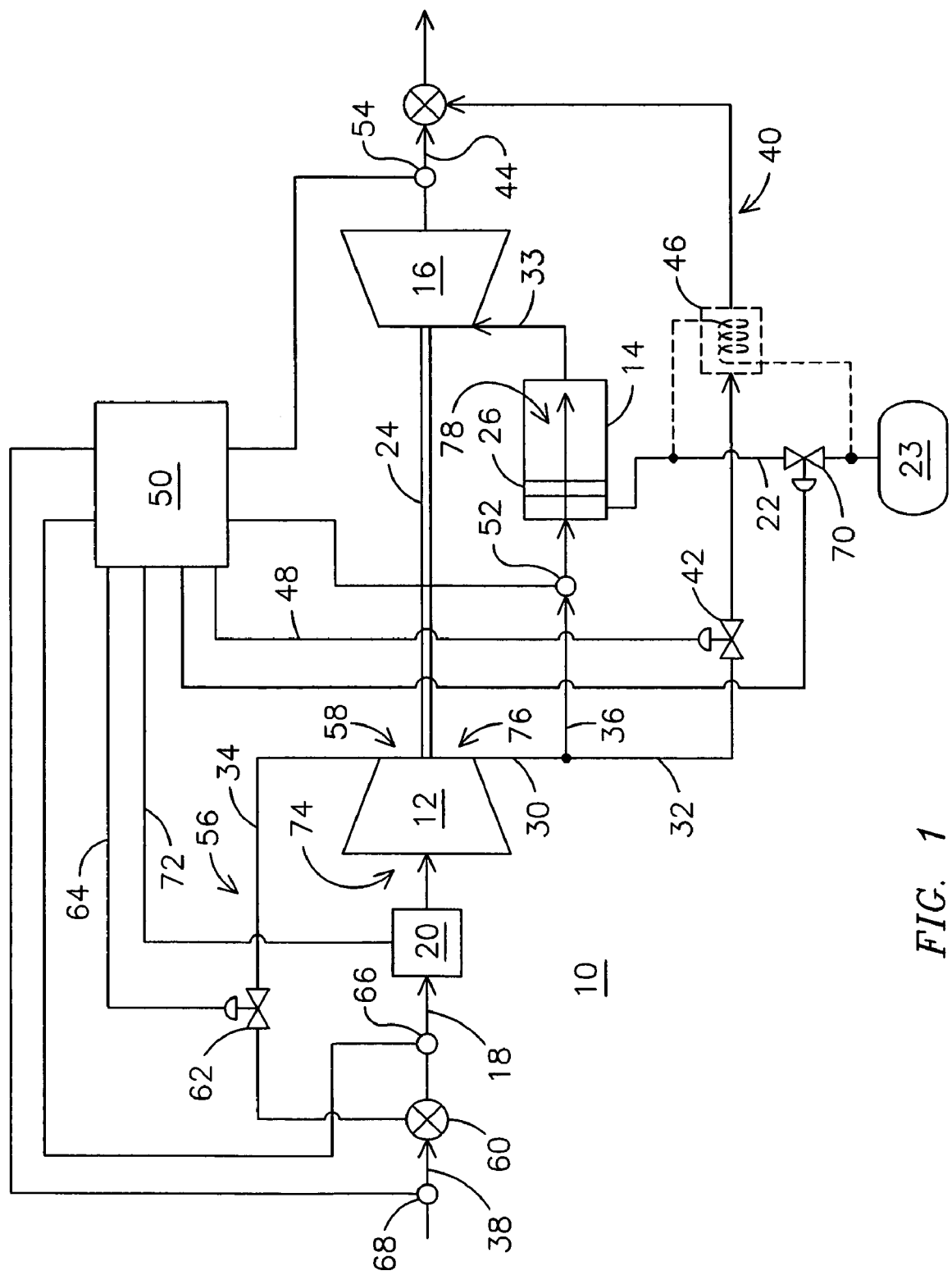
FIG. 1 is a functional diagram of a catalytic gas turbine having controlled airflows for catalyst activation.

FIG. 1 is a functional diagram of a catalytic gas turbine 10. Major components of the gas turbine 10 include a compressor 12, a catalytic combustor 14, including a catalyst 26, and a turbine 16. The gas turbine 10 receives inlet air 18 through a set of inlet guide vanes 20. The inlet air 18 is compressed by compressor 12 and delivered to combustor 14, where it is used to combust a flow of fuel 22 from a fuel source 23 to produce hot combustion gas 33. The hot combustion gas 33 is delivered to turbine 16 where it is expanded to develop shaft power. Typically, the turbine 16 and compressor 12 are connected to a common shaft 24. The aforementioned components of the gas turbine 10 are fairly typical of those found in the prior art, and other known variations of these components and related components may be used in other embodiments of the present invention.

In a typical catalytic gas turbine startup procedure, the catalyst 26 remains inactive until the temperature of the air exiting the compressor 12 and entering the combustor 14 becomes hot enough to activate the catalyst 26. A pilot (not shown) may be provided to initiate and stabilize combustion in a post catalytic combustion zone 78, for example, from a start initiation until the catalyst 26 becomes activated. As a load on the gas turbine 10 is increased during startup, the compressor outlet temperature increases until reaching an activation temperature capable of activating the catalyst 26. A typical catalyst activation temperature for catalytic gas turbine may be between 300 and 350 degrees Centigrade.

During startup, the inlet guide vanes 20 are typically closed to reduce a volume of inlet air 18 introduced into the compressor 12 and thereby help stabilize combustion during start up. Consequently, a relatively smaller volume of inlet air 18 is supplied by the compressor 14 in comparison to a volume of compressed air 30 exiting an outlet 76 of the compressor 12 when the vanes 20 are open. As a result of the lowered air volume, an air to fuel ratio (AFR) in the combustor 14 may be correspondingly lowered to improve combustion stability, provided a volume of fuel supplied to the combustor 14 is maintained. Although closed inlet guide vanes 20 may improve combustion stability by lowering the AFR, it is known that closing the inlet guide vanes 20 also lowers the temperature of the compressed air 30 exiting the compressor 14, hindering catalyst 26 activation.

Contrary to the conventional technique of closing the inlet guide vanes 20 during a startup period, the inventors have developed an innovative catalytic gas turbine operating method that includes opening, instead of closing, the inlet guide vanes 20. Opening the inlet guide vanes 20 has the advantage of increasing the temperature of compressed air 30 exiting the compressor 14 to achieve an earlier activation of the catalyst 14 than is possible with the inlet vanes 20 closed. However, when the inlet guide vanes 20 are opened, the volume of the compressed air 30 exiting the compressor and, consequently, a volume of a compressed air portion 36 entering the combustor 14, may be increased, resulting in a higher, potentially destabilizing AFR in the combustor 14. To compensate for the increased compressed air portion 36 volume, a bypass portion 32 of the compressed air 30 is diverted around the combustor 14 and turbine 16 to decrease the volume of the compressed air portion 36 entering the combustor 14. Advantageously, the AFR in the combustor 14 may be reduced, helping to prevent a destabilization effect that might be caused by an increased compressed air portion 36 volume.

In another aspect of the invention, the temperature of the compressed air 30 exiting the compressor 14 may be increased by combining a recirculation portion 34 extracted from the compressor 14 with a flow of ambient air 38 upstream of the compressor 14. As is understood in the art, compressing a gas increases the temperature of the gas. Accordingly, as a result of compression, the recirculation portion 34 will have a higher temperature than ambient air 38 entering the compressor. By combining the relatively warmer recirculation portion 34 with the relatively cooler ambient air 38 to create a warmed inlet air 18, a higher temperature compressed air 30 may be provided than would be possible without combining the recirculation portion 34 with the ambient air 38. Therefore, earlier catalyst activation may be achieved due to the higher temperature of the compressed air 30 and, consequently, a higher temperature of the compressed air portion 36 provided to the combustor 14.

To accomplish the foregoing, the gas turbine 10 further includes a bypass flow path 40 conducting the bypass portion 32 of the compressed air 30 around the combustor 14 and turbine 16. In one embodiment, the bypass portion 32 may be extracted from a later stage of compressor 12 to allow a larger volume of air to be compressed than if the bypass portion 32 was extracted from an earlier stage. By allowing compression of the larger volume of air before the bypass portion 32 is extracted, a higher temperature of the compressed air 30 may be achieved. For example, in a compressor 12 having stages numbering 1 through N, consecutively, from a lowest pressure stage to a highest pressure stage, the bypass portion 32 may be extracted from a stage having a stage number greater than N/2. In a retrofit application, the bypass portion 32 may be extracted from a preexisting bleed port in the compressor 12, thereby reducing the need for extensive modifications. In another embodiment, the bypass portion 32 may be extracted from the compressor shell (not shown).

The bypass flow path 40 may further include a bypass control valve 42, such as a metering valve, for controlling a flow of the bypass portion 32 directed around the combustor 14 and turbine 16. The bypass control valve 42 may be metered to divert a desired amount of compressed air 30 away from the combustor 14 to control the compressed air portion 36 entering the combustor 14 so that a desired AFR may be maintained. For example, the amount of compressed air 30 diverted in the bypass portion 32 may correspond to an additional amount of inlet air 18 received by the compressor 16 as a result of opening the inlet guide vanes 20. The bypass control valve 42 may be responsive to a bypass valve control signal 48 provided by a controller 50. The controller 50 may be configured to control the bypass control valve 42, for example, in response to a desired load schedule, or to maintain a desired AFR in the combustor 14. In addition, other system parameters that are useful in controlling catalytic gas turbine operation, such as temperatures, pressures, or flow rates at other locations throughout the system, may be sensed by the controller 50 to divert a desired bypass portion 32 in the bypass flow path 40 via bypass control valve 42. In a retrofit application, an existing gas turbine controller may be modified to incorporate monitoring desired system parameters to generate the bypass control signal 48. After being diverted around the combustor 14 and turbine 16, the bypass portion 32 may be released into the atmosphere, or introduced into exhaust gas 44 downstream of the turbine 16. In one embodiment, the bypass portion 32 may be passed through a heat exchanger 46, for example, to heat a fuel flow 22 provided to the combustor 14.

To increase the temperature of the compressed gas 30 exiting the compressor 12, the gas turbine 10 may further include a recirculation flow path 56 for conducting the recirculation portion 34 from a recirculation inlet 58 upstream of the catalytic combustor to a recirculation outlet 60 upstream of the compressor 12. In one embodiment, the recirculation portion 34 may be extracted from a late stage of compressor 12 to provide a comparatively higher temperature airflow 34 than may be available at an earlier stage. For example, in a compressor 12 having stages numbering 1 through N, consecutively, from a lowest pressure stage to a highest pressure stage, the recirculation portion 34 may be extracted from a stage having a stage number greater than N/2. In a gas turbine retrofit application, the recirculation portion 34 may be extracted from a preexisting bleed port in the compressor 12, thereby reducing the need for extensive modifications. In another form, the recirculation portion 34 may be extracted from the compressor shell (not shown).

The recirculation flow path 56 may further include a recirculation control valve 62, such as a metering valve, for controlling the amount of recirculation air 34 directed into the inlet air 18. The recirculation control valve 62 may be metered, for example, to maintain a desired temperature of the inlet flow 18 to achieve a desired temperature, such as a catalyst activation temperature, of the compressed air portion 36 entering the combustor 14. The recirculation control valve 62 may be responsive to a recirculation control signal 64 provided by the controller 50. The controller 50 may control the recirculation control valve 62, for example, in response to a temperature of the compressed air 30, a temperature of the exhaust gas 44, a temperature of the inlet air 18, and a temperature of the ambient air 38, measured by respective temperature sensors 52, 54, 66, 68. In addition, other system parameters, such as temperatures, pressures, or flow rates at other locations throughout the system, may be sensed by the controller 50 to control the amount of recirculation air 34 combined with the ambient air 38 via recirculation control valve 62.

The controller 50 may be further configured to control an amount of fuel provided to the combustor 14 via a fuel metering valve 70. For example, the flow of fuel 22 provided to the combustor 14 may be controlled to achieve a desired combustion condition, such as a desired firing temperature or AFR in the combustor 14. The flow of fuel 22 may be adjusted depending on an amount of the bypass portion 32 directed around the combustor 14 and turbine 16, and the amount of the recirculation air 34 diverted back to an inlet 74 of the compressor 12. In another form, the controller 50 may be configured to control the position of the inlet guides vanes 20, via an inlet guide vane control signal 72, for example, in conjunction with an amount of bypass air flow 32 diverted around the combustor 12 and turbine 16. In one embodiment, the inlet guide vanes 20 may be fully opened during start initiation, and the position of the vanes 20 adjusted after start initiation according to an amount of the bypass flow 32 diverted. Accordingly, a desired operating condition, such as a desired AFR in the combustor 14, may be achieved.

Figure 2:
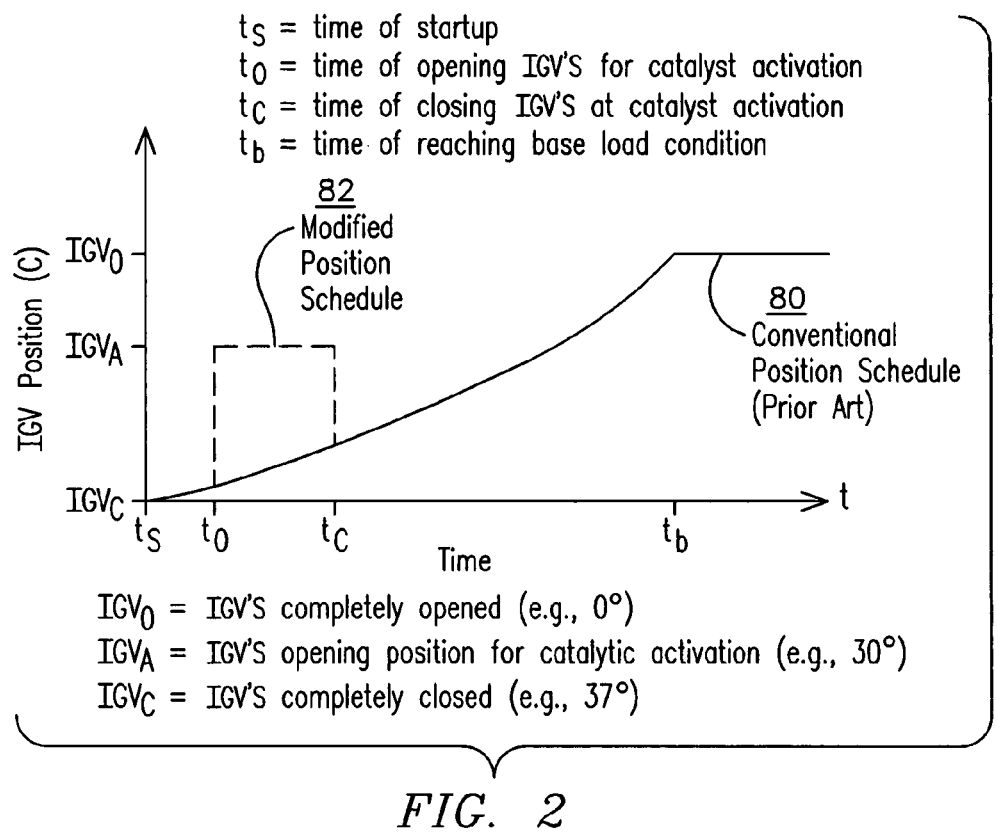
FIG. 2 is a graph illustrating an inlet guide vane opening position versus time during startup loading of a catalytic gas turbine showing a conventional inlet guide vane positioning schedule and a first exemplary modified schedule for catalyst activation.

FIG. 2 is a graph illustrating the inlet guide vane opening position versus time during startup loading of the catalytic gas turbine 10. The graph shows a conventional inlet guide vane positioning schedule 80 and an exemplary modified inlet guide vane positioning schedule 82 to achieve catalyst activation. The conventional positioning schedule 80 controls a gradual opening of the inlet guide vanes 20 from a closed position to an open position until reaching a base load at time $t_b$. For example, at startup time $t_s$, the inlet guide vanes 20 are closed, such as by positioning the vanes 20 at 37 degrees with respect to a direction of an inlet air flow, then the vanes 20 may be gradually moved to an open position, such as 0 degrees, when the gas turbine 10 reaches a desired base load at time $t_b$. In one form of the invention, the inlet guide vanes 20 are opened to a catalytic activation position, such as to a 30 degree position with respect a direction of an inlet air flow, at a time of opening, $t_o$. The vanes 20 may be maintained at this catalytic activation position according to the modified position schedule 82. It should be appreciated that the position of the vanes 20 may be changed in response to changing conditions in the gas turbine 10, but the vanes 20 will remain at a generally more open position than normally used during loading until catalytic activation is achieved. While the vanes 20 are opened to the catalytic activation position, a load on the gas turbine 10 may be increased according to a conventional loading schedule. Then, after catalyst activation at time $t_c$, the inlet guide vanes 20 may be closed to return the vanes' 20 positioning to the conventional positioning schedule 80 in which the vanes 20 are completely opened to 0 degrees at time $t_b$.

Figure 3:
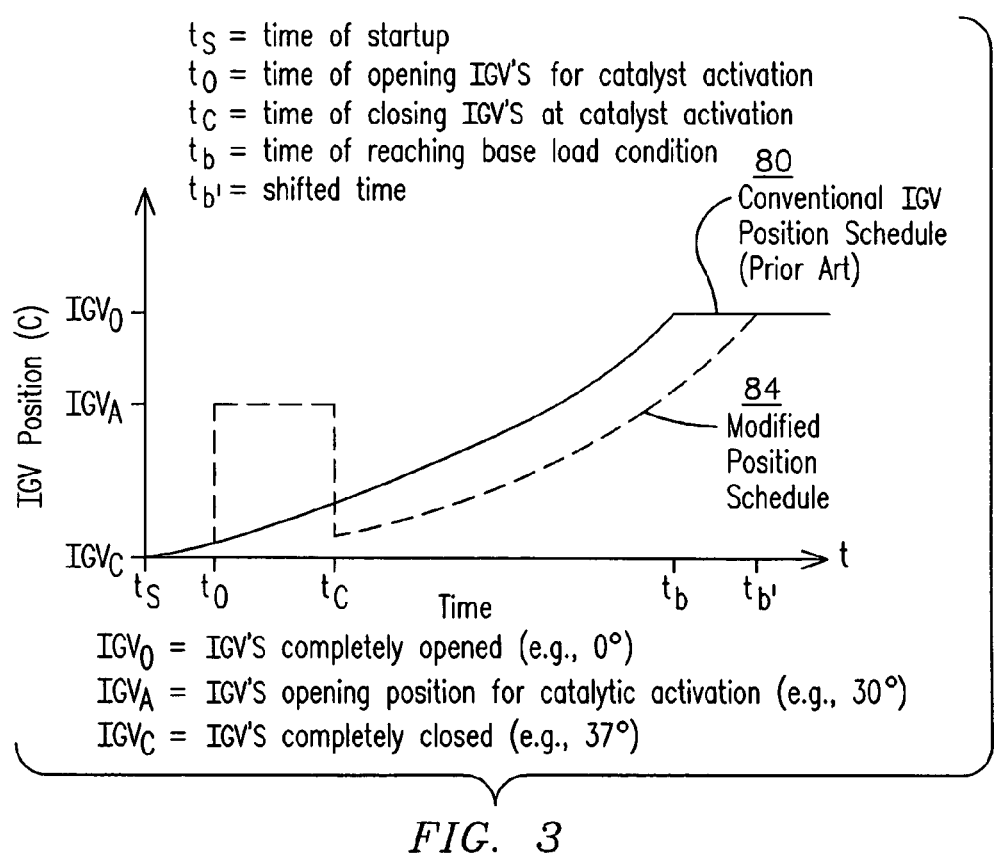
FIG. 3 is a graph illustrating the inlet guide vane opening position versus time during startup loading of a catalytic gas turbine showing a conventional inlet guide vane positioning schedule and a second exemplary modified schedule for catalyst activation.

FIG. 3 is a graph illustrating another exemplary modified position schedule 84 for the inlet guide vane opening position versus time. Instead of increasing a load on the gas turbine 10 during the modified schedule 82 as shown in FIG. 2, a load on the gas turbine 10 is kept constant while the inlet guide vanes 20 are opened for catalytic activation, according to the modified position schedule 84. For example, a load on the gas turbine 10 is kept constant while the inlet guide vanes 20 are positioned at 30 degrees with respect to a direction of an inlet air flow from a time of opening the vanes $t_o$, to time $t_c$ after catalyst activation. Once catalyst activation occurs, the inlet guide vanes are closed to about the same position as they were just before $t_o$, and then the modified position schedule 84 mirrors the conventional position schedule 80, with the result that at time $t_b$ at which the vanes are fully opened at base load according to the conventional schedule is extended to $t_{b'}$.

Figure 4:
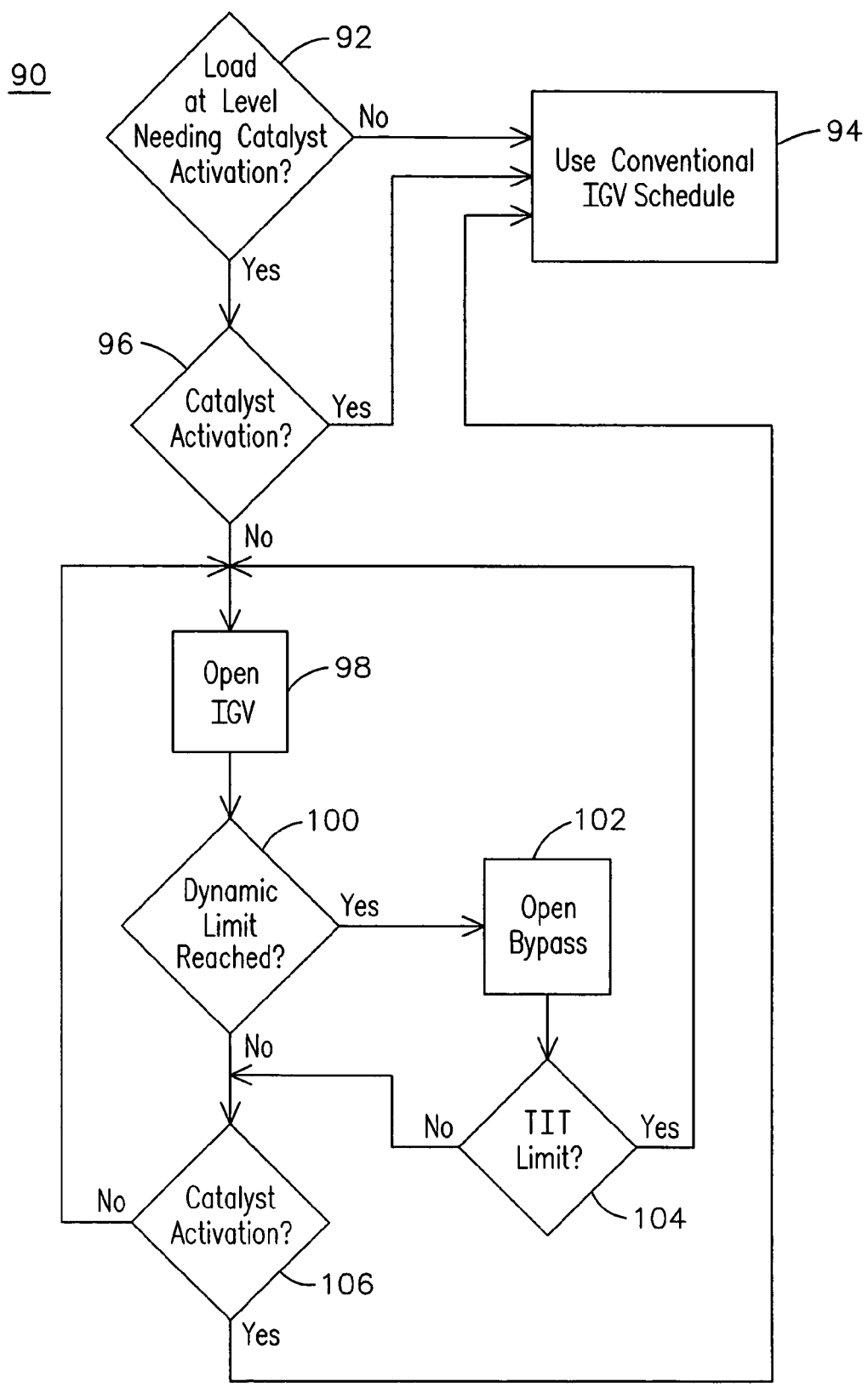
FIG. 4 is a flow chart illustrating a method of positioning inlet guide vanes of a catalytic gas turbine to provide a flow of compressed air directed downstream of a turbine of the catalytic gas turbine.

FIG. 4 is a flow chart illustrating a method of positioning inlet guide vanes of a catalytic gas turbine to provide a flow of compressed air directed downstream of a turbine of the catalytic gas turbine. In one form, the controller 50 may be configured to perform the steps shown in the flow chart 90. The control method may be initiated when it is desired to load the gas turbine 10 to a loading level at which catalytic activation is needed. If the desired loading level at which catalytic activation is needed has not been reached 92, then a conventional loading schedule is used 94. If the desired loading level 92 has been reached and catalytic activation 96 has already occurred, the conventional loading schedule is used 94. If, however, a loading level at which catalytic activation has been reached without catalytic activation, the inlet guide vanes 20 are opened 98, for example, from their normally closed position, to allow a larger volume of air to enter the combustor 14 than is conventionally supplied. If, after opening the inlet guide vanes 20, a predetermined dynamic limit of the combustor 14 is reached 100, then the bypass control valve 42 may be opened 102 to bypass a portion of the compressed air around the combustor 14 and turbine 16. For example, an increase in the AFR in the combustor 14 may also increase combustion dynamics therein. By bypassing a portion of the compressed air around the combustor 14, the AFR in the combustor may be reduced, thereby reducing combustion dynamics. Alternatively, if the dynamic limit is not reached in step 100, then the catalyst 26 is monitored to determine if catalytic activation 106 has occurred.

If, after step 102, the TIT limit is reached 104, then the inlet guide vanes 20 may be opened 98 further, and control of the gas turbine 10 continues with testing to see if the dynamic limit has been reached 100. If the TIT limit is not reached upon opening the bypass valve 102, the catalyst 26 is monitored to determine if catalytic activation 106 has occurred. If no catalytic activation has occurred, the control of the gas turbine 10 continues by opening the inlet guide vanes 20 further 98. For example, the inlet guide vanes 20 may be opened in incremental steps ranging from two to four degrees each time step 98 is executed. Once catalytic activation has occurred 106, the conventional loading schedule is used 94.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A catalytic gas turbine comprising:
    a compressor receiving an inlet air and producing compressed air,
    a catalytic combustor receiving a combustion portion of the compressed air and producing a hot combustion gas;
    a turbine receiving the combustion gas;
    a flow path conducting a bypass portion of the compressed air around the combustor and turbine; and
    further comprising a recirculation flow path receiving a recirculation portion of the compressed air and conducting the recirculation portion into the inlet air.

2. The catalytic gas turbine of claim 1, further comprising a bypass metering valve, responsive to a bypass valve control signal, positioned in the flow path for controlling a flow of the bypass portion.

3. The catalytic gas turbine of claim 2, further comprising a controller for generating the bypass valve control signal responsive to at least one of the group consisting of an air-to-fuel ratio in the catalytic combustor, a temperature of a catalyst in the combustor, a temperature of the combustion gas, and the speed of rotation of the turbine.

4. The catalytic gas turbine of claim 1, wherein the compressor comprises stages numbering 1 through N consecutively from a lowest pressure stage to a highest pressure stage, the bypass portion extracted from a stage having a stage number greater than N/2.

5. A catalytic gas turbine comprising:
    a compressor receiving inlet air and producing compressed air;
    a catalytic combustor receiving a combustion portion of the compressed air and producing a combustion gas;

a turbine receiving the combustion gas and producing an exhaust gas; and a flow path receiving a recirculation portion of the compressed air and conducting the recirculation portion into the inlet air.

6. The catalytic gas turbine of claim 5, further comprising a recirculation metering valve, responsive to a recirculation valve control signal, positioned in the flow path for controlling a flow of the recirculation portion.

7. The catalytic gas turbine of claim 6, further comprising a controller for generating the recirculation valve control signal responsive to at least one of the group consisting of a temperature of the combustion gas, a temperature of the exhaust gas, a temperature of the inlet air, and a temperature of an ambient air.

8. The catalytic gas turbine of claim 6, wherein the compressor comprises stages numbering 1 through N consecutively from a lowest pressure stage to a highest pressure stage, the recirculation inlet disposed downstream of a stage having a stage number greater than N/2.

* * * * *